(12) United States Patent
Leung et al.

(10) Patent No.: US 8,490,119 B2
(45) Date of Patent: Jul. 16, 2013

(54) COMMUNICATION INTERFACE FOR NON-COMMUNICATION APPLICATIONS

(75) Inventors: Yiu-Ming Leung, Kirkland, WA (US); Rui Liang, Sammamish, WA (US); Yu Shao, Bellevue, WA (US); Marcelo Farjalla, Seattle, WA (US); Li Zhang, Sammamish, WA (US); Danilo Perez Solano, Redmond, WA (US); Sergei Osobov, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 267 days.

(21) Appl. No.: 12/967,770

(22) Filed: Dec. 14, 2010

(65) Prior Publication Data

US 2012/0151500 A1    Jun. 14, 2012

(51) Int. Cl.
*G06F 3/00*    (2006.01)

(52) U.S. Cl.
USPC ........................................................ 719/328

(58) Field of Classification Search
USPC ........................................................ 719/328
See application file for complete search history.

(56) References Cited

U.S. PATENT DOCUMENTS

| | | | |
|---|---|---|---|
| 6,269,254 B1* | 7/2001 | Mathis | 455/557 |
| 7,426,688 B2* | 9/2008 | Serra et al. | 715/212 |
| 7,801,968 B2 | 9/2010 | Wang et al. | |
| 7,975,045 B2* | 7/2011 | Underwood | 709/224 |
| 2002/0188629 A1* | 12/2002 | Burfoot | 707/503 |
| 2003/0101086 A1* | 5/2003 | San Miguel | 705/9 |
| 2004/0051740 A1* | 3/2004 | Reichel et al. | 345/789 |
| 2006/0112123 A1* | 5/2006 | Clark et al. | 707/101 |
| 2007/0239429 A1 | 10/2007 | Johnson et al. | |
| 2007/0299679 A1* | 12/2007 | Sudan et al. | 705/1 |
| 2009/0328062 A1 | 12/2009 | Ganesan et al. | |
| 2010/0262900 A1* | 10/2010 | Romatier et al. | 715/219 |

OTHER PUBLICATIONS

Sudipto, Implementation Strategy for AI-ESTATE compliance the Remote Diagnosis Server(RDS) framework, 2001.*
Cmayo., "UC "14" Developer FAQ", Retrieved at <<http://blogs.msdn.com/b/cmayo/archive/2010/02/24/uc-14-developer-faq.aspx>>, Feb. 24, 2010, pp. 1.
Ollason, David., "The New Microsoft Communicator "14" SDK: Integrating, Extending and Adding Contextual Data to the New Communicator Experience", Retrieved at <<http://webcache.googleusercontent.com/search?q=cache:1tS5fmYG1nQJ:ecn.channel9.msdn.com/o9/te/NorthAmerica/2010/pptx/UNC322.pptx+communicator+14+API+%2B+microsoft+communicator+%2B+object+model&cd=1&hl=en&ct=cink&gl=in&client=firefox-a>>, Retrieved Date: Nov. 1, 2010, pp. 13.
"Next Generation Telephony", Retrieved at <<.google.co.In/url?sa=t&source=web&cd=1&ved=0CBYQFjAA&url=http%3A%2F%2Fdownload.microsoft.com%2Fdownload%2FF%2F4%2F0%2FF409709D-D73E-4804-9B4E-DD4C62B8A0E9%2FNext%2520Generation%2520Telephony%2520paper%2520v%25201%252002.pdf&rct=j&q=patents%3Amicrosoft%20communicator%204%20%2B%20third%20party%20application%20%2B%20integration&ei=NGPOTPqiNIWUjAeBuZXYBw&usg=AFQjCNEGU.
"Application Enablement Services", Retrieved at <<.avaya.com/uk/resource/assets/factsheet/lb2747_-_microsoft_oc_-_update_2-14-08.pdf>>, pp. 2, Feb. 14, 2008.
"About Office Communicator Automation API", Retrieved at <<http://msdn.microsoft.com/en-us/library/bb758805%28v=office.12%29.aspx>>, Retrieved Date: Nov. 1, 2010, pp. 3.

* cited by examiner

*Primary Examiner* — Lechi Truong
(74) *Attorney, Agent, or Firm* — Turk IP Law, LLC (57) ABSTRACT

Software applications are enabled with multimodal communication capabilities and features associated with enhanced communication systems through a communication application programming interface (API). Applications for document processing, scheduling, audio/video data processing, and/or business operations can exchange communication system data and parameters bi-directionally with components of an enhanced communication system, initiate communication sessions through the application's user interface, and preserve post-communication updates.

17 Claims, 6 Drawing Sheets

COMMUNICATION INTERFACE FOR NON-COMMUNICATION APPLICATIONS

BACKGROUND

Modern communication systems such as unified communications (UC) systems combine various modes of communication (e.g. instant messaging, voice calls, video communications, etc.) and provide ancillary services like presence, recording, interactive contact lists, etc. With the ever easier to establish single or multimodal conversations and sharing capabilities, physical distances between co-workers, partners, and colleagues are eliminated through virtual connections.

Another set of tools that makes life easier and increases efficiency includes a wide variety of applications that enables users to create/edit/share word processing documents, spreadsheets, calendars, presentations, analyses, reports, audio files, video files, and comparable ones. The data (e.g., documents) created by such applications are typically part of the context of discussions and exchanges between users of enhanced communication services. To include such contextual data in communication sessions, however, users typically have to activate a communication application, a relevant application or data sharing component and then exchange the information. Moreover, a number of potential capabilities of the communication applications or other applications are not exploited since communication applications and other applications are typically unrelated programs.

SUMMARY

This summary is provided to introduce a selection of concepts in a simplified form that are further described below in the Detailed Description. This summary is not intended to exclusively identify key features or essential features of the claimed subject matter, nor is it intended as an aid in determining the scope of the claimed subject matter.

Embodiments are directed to enabling software applications with multimodal communication capabilities and features associated with enhanced communication systems. According to some embodiments, a communication application programming interface (API) may be provided for applications such as document processing, scheduling, audio/video data processing, business applications, and comparable ones such that communication system data and parameters can be bi-directionally exchanged, communication sessions initiated through an application user interface, and post-communication updates preserved through the application.

These and other features and advantages will be apparent from a reading of the following detailed description and a review of the associated drawings. It is to be understood that both the foregoing general description and the following detailed description are explanatory and do not restrict aspects as claimed.

DETAILED DESCRIPTION

As briefly described above, non-communication software applications may be enabled with multimodal communication capabilities and features associated with enhanced communication systems through a communication application programming interface (API). Applications for document processing, scheduling, audio/video data processing, and/or business operations can exchange communication system data and parameters bi-directionally with components of an enhanced communication system, initiate communication sessions through the application's user interface, and preserve post-communication updates. In the following detailed description, references are made to the accompanying drawings that form a part hereof, and in which are shown by way of illustrations specific embodiments or examples. These aspects may be combined, other aspects may be utilized, and structural changes may be made without departing from the spirit or scope of the present disclosure. The following detailed description is therefore not to be taken in a limiting sense, and the scope of the present invention is defined by the appended claims and their equivalents.

While the embodiments will be described in the general context of program modules that execute in conjunction with an application program that runs on an operating system on a computing device, those skilled in the art will recognize that aspects may also be implemented in combination with other program modules.

Generally, program modules include routines, programs, components, data structures, and other types of structures that perform particular tasks or implement particular abstract data types. Moreover, those skilled in the art will appreciate that embodiments may be practiced with other computer system configurations, including hand-held devices, multiprocessor systems, microprocessor-based or programmable consumer electronics, minicomputers, mainframe computers, and comparable computing devices. Embodiments may also be practiced in distributed computing environments where tasks are performed by remote processing devices that are linked through a communications network. In a distributed computing environment, program modules may be located in both local and remote memory storage devices.

Embodiments may be implemented as a computer-implemented process (method), a computing system, or as an article of manufacture, such as a computer program product or computer readable media. The computer program product may be a computer storage medium readable by a computer system and encoding a computer program that comprises instructions for causing a computer or computing system to perform example process(es). The computer-readable storage medium can for example be implemented via one or more of a volatile computer memory, a non-volatile memory, a hard drive, a flash drive, a floppy disk, or a compact disk, and comparable media.

Throughout this specification, the term "platform" may be a combination of software and hardware components for managing enhanced communication systems. Examples of platforms include, but are not limited to, a hosted service executed over a plurality of servers, an application executed on a single server, and comparable systems. The term "server" generally refers to a computing device executing one or more software programs typically in a networked environment. However, a server may also be implemented as a virtual server (software programs) executed on one or more computing devices viewed as a server on the network. More detail on these technologies and example operations is provided below.

Figure 1:
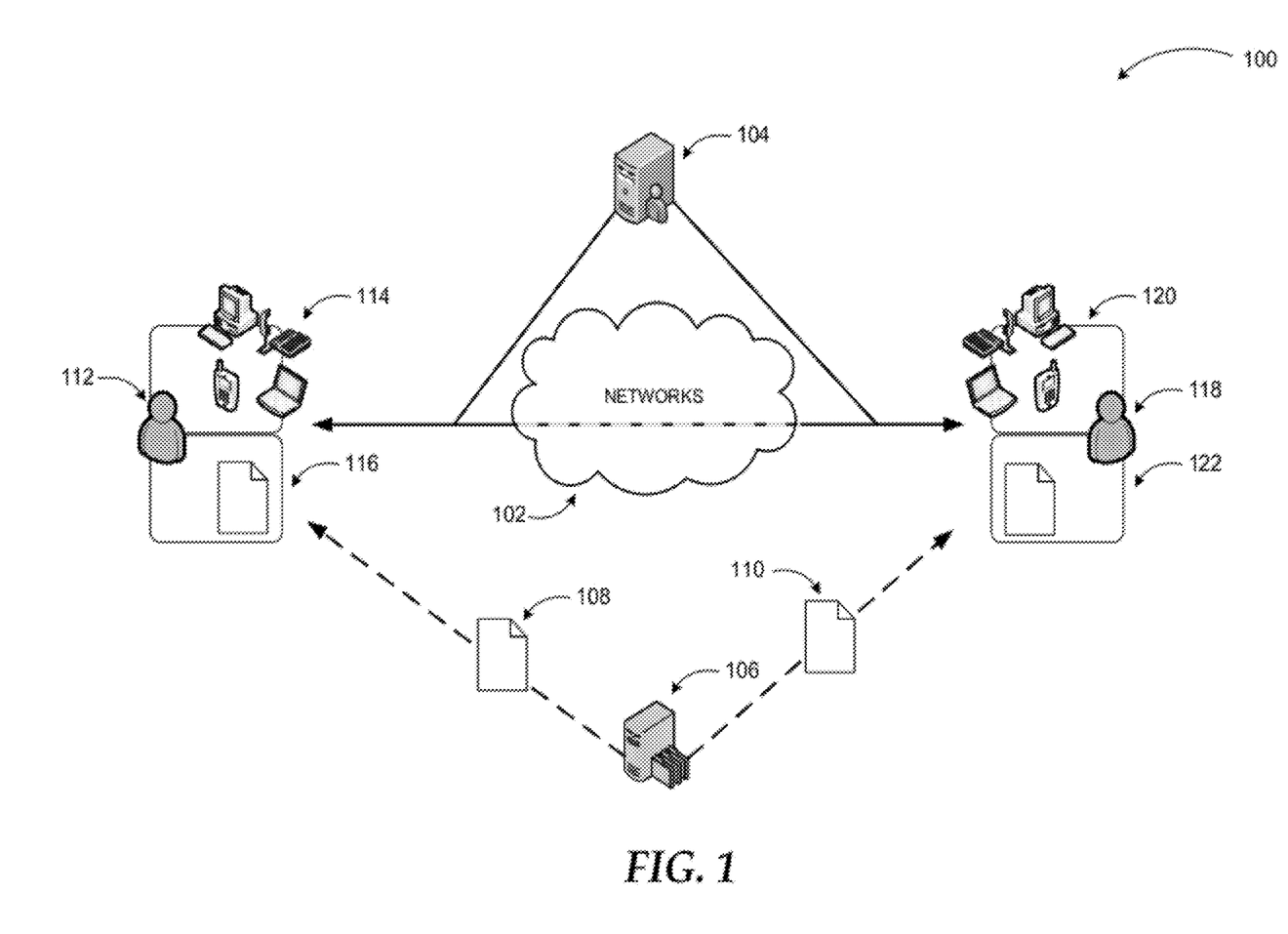
FIG. 1 is a conceptual diagram illustrating an example networked communication and document use environment, where a communication interface for non-communication applications may be implemented.

FIG. 1 is a conceptual diagram illustrating an example networked communication and document use environment, where a communication interface for non-communication applications may be implemented. An enhanced communication system can facilitate multimodal communications between users including sharing of various forms of data such as documents.

A unified communication (UC) system is an example of enhanced communication systems with a wide range of capabilities and services that can be provided to subscribers. A unified communication system is a real-time communications system facilitating email exchange, instant messaging, presence, audio-video conferencing, web conferencing, and similar functionalities.

In a UC system such as the one shown in diagram 100, users may communicate via a variety of end devices 114 and 120, which are client devices of the UC system. Each client device may be capable of executing one or more communication applications for voice communication, video communication, instant messaging, application sharing, data sharing, and the like. In addition to their advanced functionality, the end devices may also facilitate traditional phone calls through an external connection such as through Private Branch Exchange (PBX) to a Public Switched Telephone Network (PSTN) or cellular communications through a cellular network.

The communication system shown in diagram 100 may include a number of servers performing different tasks. For example, communication server 104 may manage conversations between users (112, 118) over one or more networks 102. Separately from the communication system, users 112 and 118 may have locally installed applications 116 and 122 for a variety of tasks such as document processing, analysis, calendaring, scheduling, audio or video data processing, graphic processing, and similar ones. In some cases, application 116 and 122 may be client applications of a hosted service executed by server 106. In such scenarios, data (e.g., documents, images, audio/video files, etc.) may be shared between users and provided to the individual users from server 106 (e.g. documents 108, 110).

In a system according to embodiments, applications 116, 122 may be enabled with multimodal communication capabilities and features associated with the enhanced communication systems through a communication API. Applications 116, 122 may exchange communication system data and parameters (e.g., rich presence information) bi-directionally with components of the enhanced communication system, facilitate communication sessions in one or more modalities (e.g., start a conversation in one or more modalities, join a conference, share data/applications) through the application's user interface, and preserve post-communication updates (e.g., changes to shared documents/data, conversation history, etc.).

While the example system in FIG. 1 has been described with specific components such as communication servers, application servers, and similar devices, embodiments are not limited to these components or system configurations and can be implemented with other system configuration employing fewer or additional components. A communication interface for non-communication applications may be implemented in a distributed manner among the components of the system depending on component capabilities and system configuration. Furthermore, embodiments are not limited to unified communication systems. The approaches discussed here may be applied to any multimodal communication system using the principles described herein.

Figure 2:
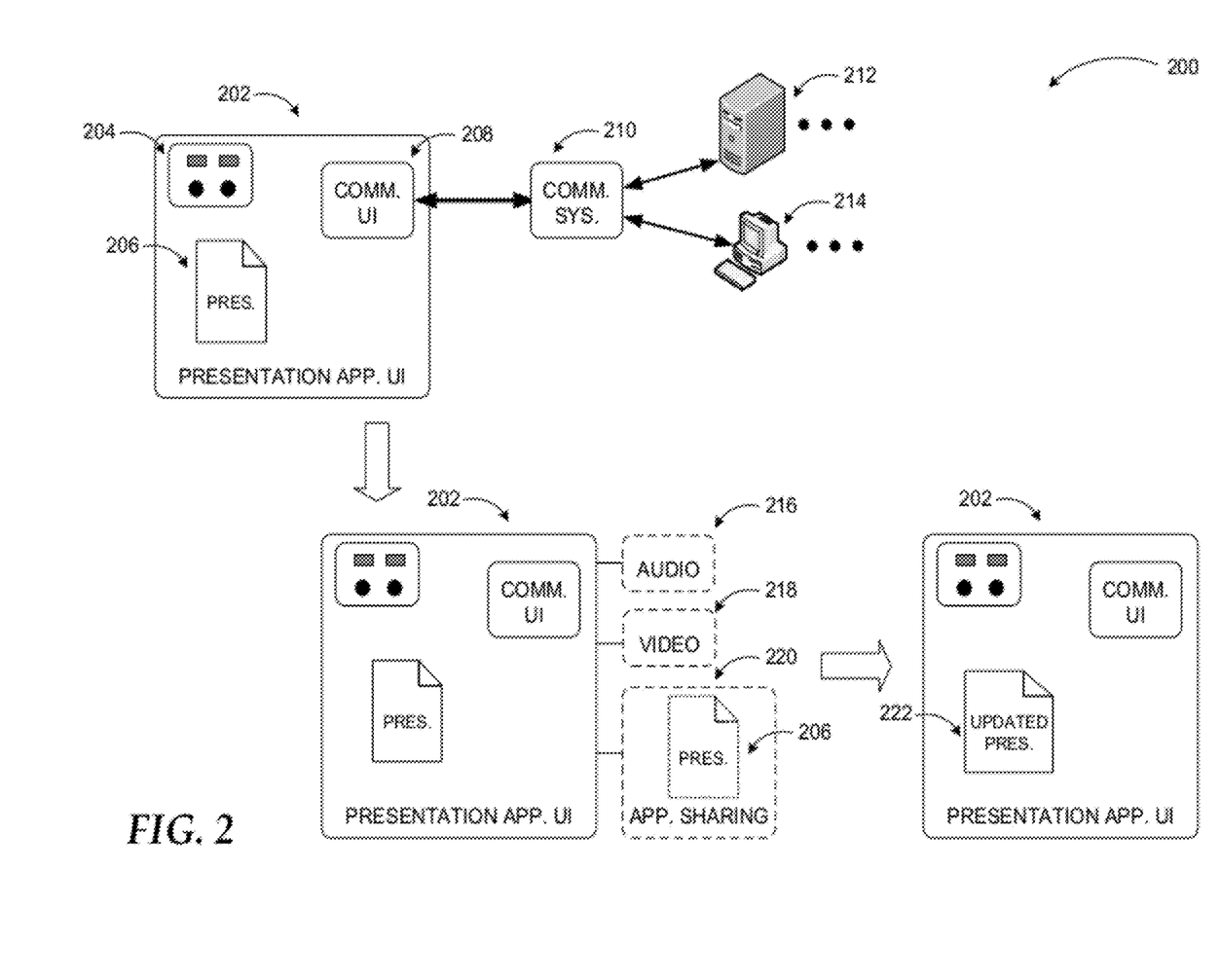
FIG. 2 illustrates an example implementation of enhanced communication capable non-communication application according to some embodiments.

FIG. 2 illustrates an example implementation of enhanced communication capable non-communication application according to some embodiments. While integration with enhanced communication systems may be implemented with any application, a presentation application is displayed as example in diagram 200.

Presentation application user interface 202 may display a presentation 206 and provide controls 204 for editing various aspects of the presentation 206. The presentation application may be locally installed or a hosted application accessed through a thin client (e.g., a browser). Thus, presentation application user interface 202 may be the user interface of the locally installed application or a web page customized for providing the features of a hosted presentation application. According to some embodiments, an embedded communication user interface 208 may be provided through a communication API. Communication user interface 208 may also be a "docked" user interface (i.e., a separate user interface attached to the presentation application user interface 202).

The presentation application may communicate with servers 212 and clients 214 of communication system 210 facilitating single or multimodal communications and receiving data associated with communication system features. For example, contact information associated with an organization may be retrieved by the presentation application to enable a user initiate communication sessions with other users in the organization. The same data may also be utilized for inherent functions of the presentation application such as creating an organization chart, etc.

According to an example scenario, a user may initiate a multimodal communication session involving audio communications, video communications, and application sharing through the communication user interface 208. Upon establishment of the communication session, new user interfaces 216, 218, and 220 may be provided for the respective modalities either as separate user interfaces or in an embedded format. For example, presentation 206 may be displayed in application sharing user interface 220 for collaboration during the communication session. Changes may be made to the presentation during the communication session. The updated presentation 222 may be saved and/or displayed in the presentation application user interface 202 upon completion of the communication session. Additional data such as conversation history and any other information created or modified during the communication session may also be preserved by the presentation application.

Figure 3:
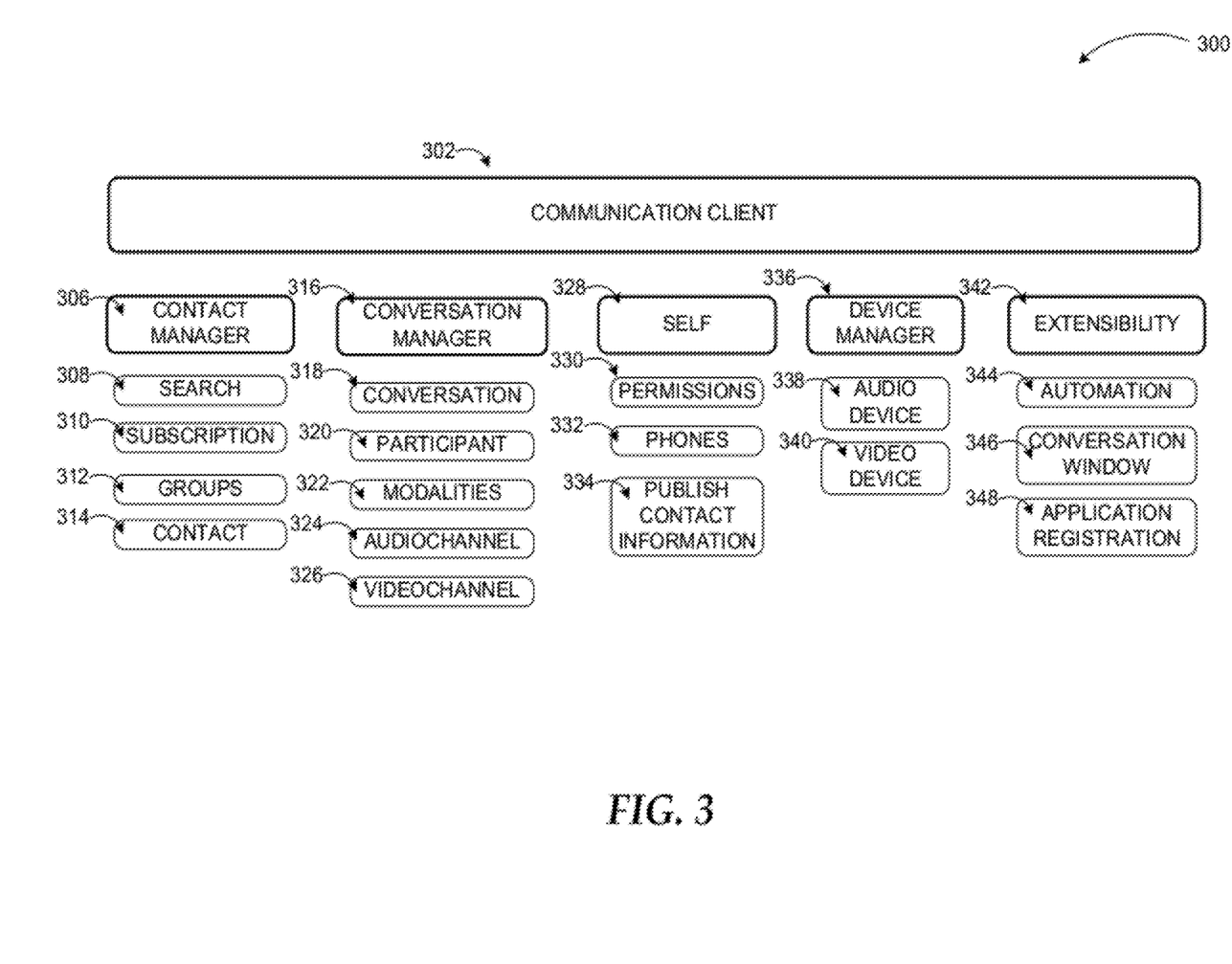
FIG. 3 illustrates an example object model for a communication API to be implemented in a non-communication application according to embodiments.

FIG. 3 illustrates an example object model for a communication API to be implemented in a non-communication application. According to some embodiments, a rich API may be exposed to non-communication applications allowing them to integrate with enhanced communication systems to get rich presence information, start conversation, join conference, start/communicate with participants with different modalities, and perform other communication related tasks.

As diagram 300 shows, communication client 302 is a root entry point for the application. Contact manager 306, conversation manager 316, and device manager 336 are management objects that can be accessed through the root object and manage other object groups. Contact manager 306 may manage individual contact objects 314, contact group objects 312, and related classes, including search objects 308 and subscription objects (for presence) 310. Contact and group information may be obtained through instances of those classes.

Conversation manager object 316 manages conversations 318. The application using the API may create conversations 318, start or accept different modalities 322, add or remove participants 320, and start audio and/or video by accessing the instances of audio channel 324 and video channel 326 classes under conversation manager 316. Device manager 336 manages registered audio and video devices 338 and 340 through which multimodal communications may be facilitated.

From the root object communication client 302, a self class 328 may be exposed to manage the permissions 330 granted for other contacts to access a user's published information. Users may also be enabled to publish their contact information (334) to the communication system or edit their phones 332 under the self class 328. The communication API may also provide extensibility classes 342, for callers to make simple API calls to start conversations (automation 344), for docking/undocking a conversation window 346, and for registering application packages 348 that can be used for extensibility.

The object model for the communication API illustrated in diagram 300 is an example one, and does not constitute a limit on embodiments. An API according to embodiments may include additional or fewer objects. For example, user's computing device capabilities (processing power, available memory, etc.), application's capabilities, network capabilities, and similar ones may be managed as objects by the API.

Figure 4:
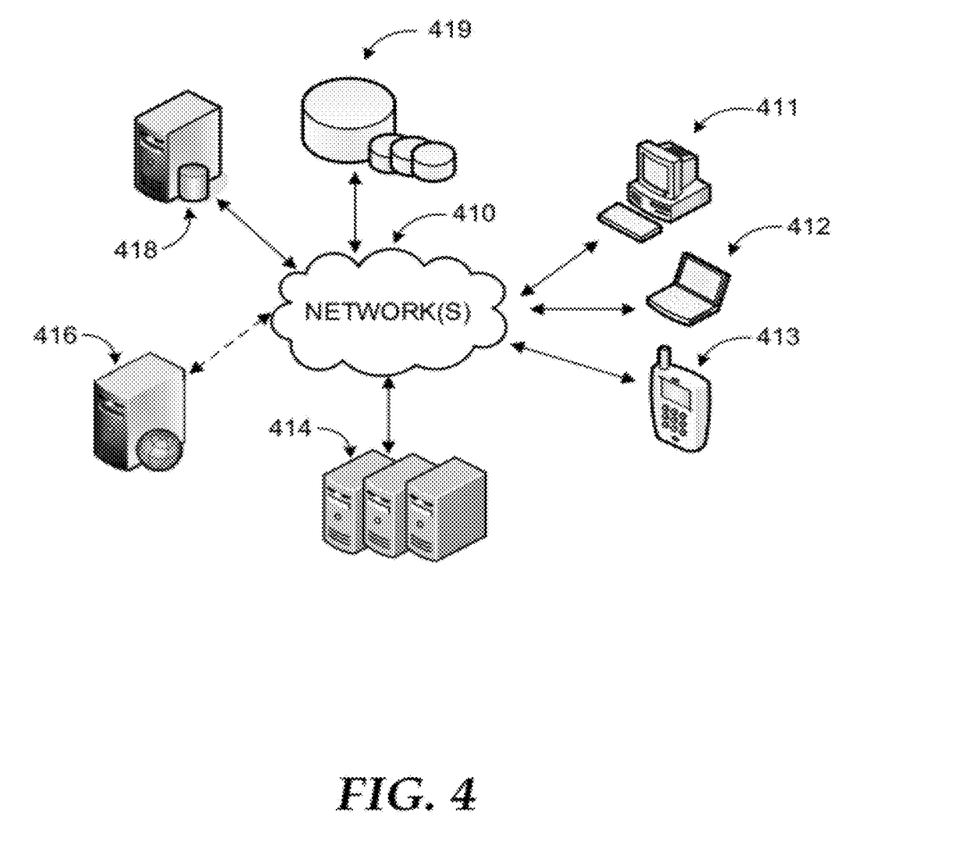
FIG. 4 is a networked environment, where a system according to embodiments may be implemented.

FIG. 4 is an example networked environment, where embodiments may be implemented. Enabling non-communication applications with communication capabilities through a communication API may be implemented via software executed over one or more servers 414 or a single server (e.g. web server) 416 such as a hosted service. The platform may communicate with client applications on individual computing devices such as a smart phone 413, a laptop computer 412, or desktop computer 411 ('client devices') through network(s) 410 providing communication and other services.

As discussed above, multimodal communication capabilities and features associated with enhanced communication systems may be integrated into applications for document processing, scheduling, audio/video data processing, and/or business operations enabling them to exchange communication system data and parameters bi-directionally with components of an enhanced communication system, initiate communication sessions through the application's user interface, and preserve post-communication updates.

Client devices 411-413 may enable access to communication applications executed on remote server(s) (e.g. one of servers 414) as discussed previously. The server(s) may retrieve or store relevant data from/to data store(s) 419 directly or through database server 418.

Network(s) 410 may comprise any topology of servers, clients, Internet service providers, and communication media. A system according to embodiments may have a static or dynamic topology. Network(s) 410 may include secure networks such as an enterprise network, an unsecure network such as a wireless open network, or the Internet. Network(s) 410 may also coordinate communication over other networks such as Public Switched Telephone Network (PSTN) or cellular networks. Furthermore, network(s) 410 may include short range wireless networks such as Bluetooth or similar ones. Network(s) 410 provide communication between the nodes described herein. By way of example, and not limitation, network(s) 410 may include wireless media such as acoustic, RF, infrared and other wireless media.

Many other configurations of computing devices, applications, data sources, and data distribution systems may be employed to provide communication capabilities to non-communication applications. Furthermore, the networked environments discussed in FIG. 4 are for illustration purposes only. Embodiments are not limited to the example applications, modules, or processes.

Figure 5:
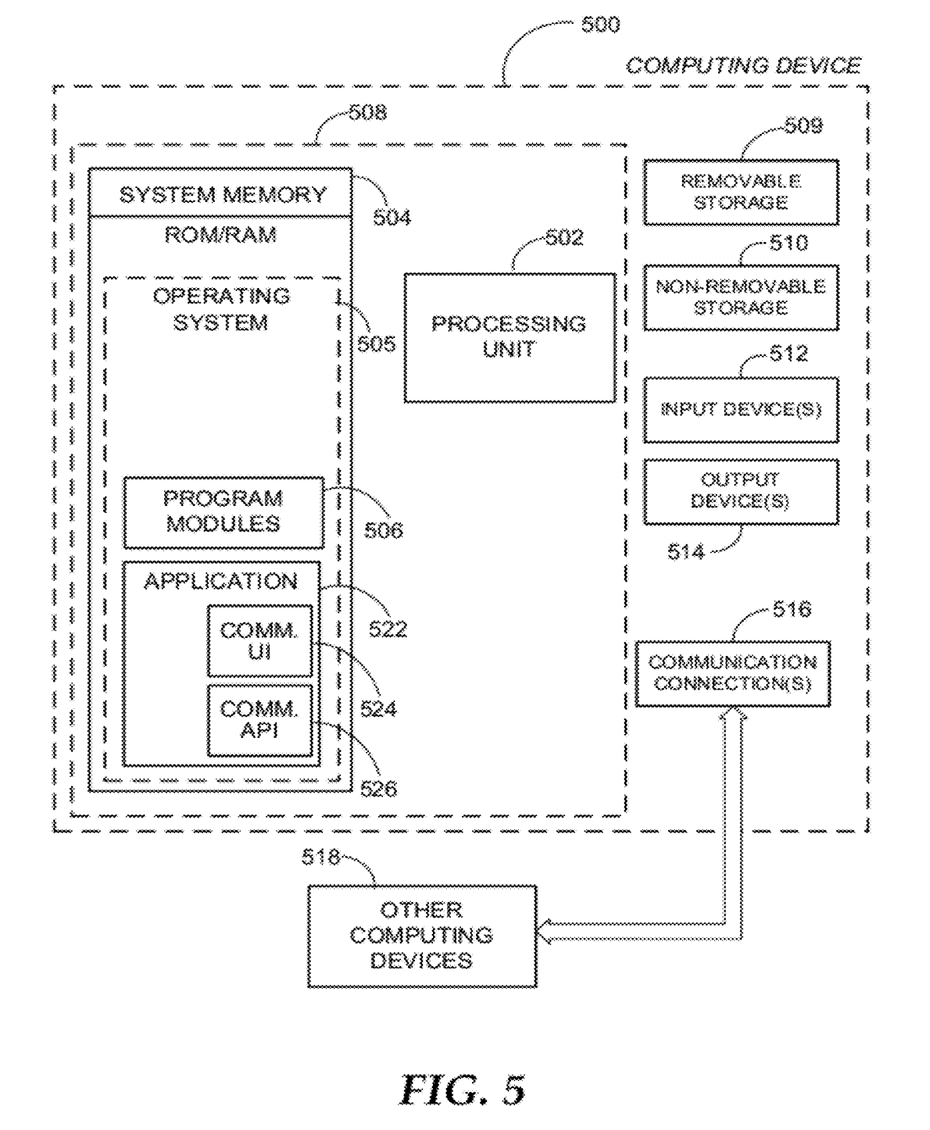
FIG. 5 is a block diagram of an example computing operating environment, where embodiments may be implemented.

FIG. 5 and the associated discussion are intended to provide a brief, general description of a suitable computing environment in which embodiments may be implemented. With reference to FIG. 5, a block diagram of an example computing operating environment for an application according to embodiments is illustrated, such as computing device 500. In a basic configuration, computing device 500 may be any computing device executing a non-communication application with a capability to connect to a network and include at least one processing unit 502 and system memory 504. Computing device 500 may also include a plurality of processing units that cooperate in executing programs. Depending on the exact configuration and type of computing device, the system memory 504 may be volatile (such as RAM), non-volatile (such as ROM, flash memory, etc.) or some combination of the two. System memory 504 typically includes an operating system 505 suitable for controlling the operation of the platform, such as the WINDOWS® operating systems from MICROSOFT CORPORATION of Redmond, Wash. The system memory 504 may also include one or more software applications such as program modules 506, application 522, communication user interface 524, and communication API 526.

Application 522 may be any application that provides a wide variety of services such as editing documents, analysis, reporting, calendaring, scheduling, viewing, and so on. Communication API 526 may enable application 522 with communication capabilities through an enhanced communication system such that data like presence information can be exchanged, communication sessions initiated and facilitated through communication user interface 524, and post-communication updates preserved at the application 522. This basic configuration is illustrated in FIG. 5 by those components within dashed line 508.

Computing device 500 may have additional features or functionality. For example, the computing device 500 may also include additional data storage devices (removable and/or non-removable) such as, for example, magnetic disks, optical disks, or tape. Such additional storage is illustrated in FIG. 5 by removable storage 509 and non-removable storage 510. Computer readable storage media may include volatile and nonvolatile, removable and non-removable media implemented in any method or technology for storage of information, such as computer readable instructions, data structures, program modules, or other data. System memory 504, removable storage 509 and non-removable storage 510 are all examples of computer readable storage media. Computer readable storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 500. Any such computer readable storage media may be part of computing device 500. Computing device 500 may also have input device(s) 512 such as keyboard, mouse, pen, voice input device, touch input device, and comparable input devices. Output device(s) 514 such as a display, speakers, printer, and other types of output devices may also be included. These devices are well known in the art and need not be discussed at length here.

Computing device 500 may also contain communication connections 516 that allow the device to communicate with other devices 518, such as over a wireless network in a distributed computing environment, a satellite link, a cellular link, and comparable mechanisms. Other devices 518 may include computer device(s) that execute communication applications, storage servers, and comparable devices. Communication connection(s) 516 is one example of communication media. Communication media can include therein computer readable instructions, data structures, program modules, and includes any information delivery media. By way of example, and not limitation, communication media includes wired media such as a wired network or direct-wired connection, and wireless media such as acoustic, RF, infrared and other wireless media.

Example embodiments also include methods. These methods can be implemented in any number of ways, including the structures described in this document. One such way is by machine operations, of devices of the type described in this document.

Another optional way is for one or more of the individual operations of the methods to be performed in conjunction with one or more human operators performing some. These human operators need not be co-located with each other, but each can be only with a machine that performs a portion of the program.

Figure 6:
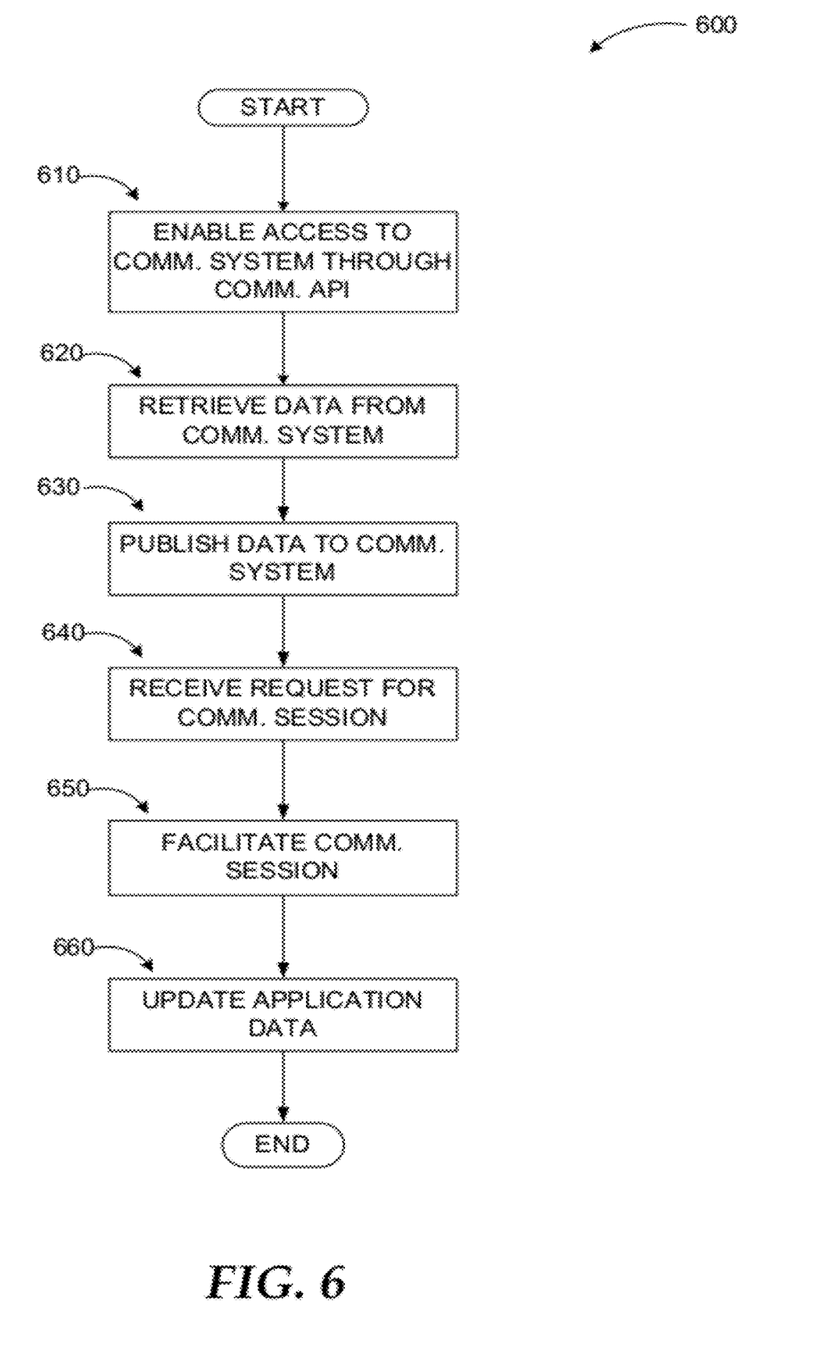
FIG. 6 illustrates a logic flow diagram for a process of providing enhanced communication capabilities in a non-communication application according to some embodiments.

FIG. 6 illustrates a logic flow diagram for a process of enhanced communication capabilities in a non-communication application according to embodiments. Process 600 may be implemented by a computing device executing an application and having network connectivity.

Process 600 may begin at operation 610, where a rich API is exposed to the application enabling the application to integrate with enhanced communication systems. As discussed previously, a root entry point object may be used for a number of manager objects managing different capabilities and functionalities associated with enhanced communication services. At operation 620, the application may be enabled to retrieve data from the communication system such as presence information, contact information, and comparable ones. The data may be used in communication functionality as well as for inherent purposes of the application. For example, if the application is a scheduling application, it may use the received presence data to set up schedules.

At operation 630, data associated with the application and/or user may be published to the communication system by the application. At operation 640, a request may be received from a user to initiate a communication session through a communication portion of the application user interface enabled by the communication API. At operation 650, the application may facilitate the communication session, enabling exchange of data associated with the application's inherent functions. At operation 660, any updated application data may be preserved by the application upon completion of the communication session. For example, if the communication session involves sharing of a presentation and changes are made during the communication session, the updated presentation may be saved by the application.

The operations included in process 600 are for illustration purposes. Enhanced communication capabilities in a non-communication application according to embodiments may be implemented by similar processes with fewer or additional steps, as well as in different order of operations using the principles described herein.

The above specification, examples and data provide a complete description of the manufacture and use of the composition of the embodiments. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims and embodiments.

What is claimed is:

1. A method executed at least in part by a computing device for enabling non-communication applications with enhanced communication capabilities, the method comprising:
 exposing a rich communication application programming interface (API) provided by an embedded user interface to a non-communication application, wherein the exposure allows the non-communication application to integrate with enhanced communication systems to achieve rich presence information and perform communication related tasks;
 receiving communication-related data from an enhanced communication system through the API;
 publishing data to the enhanced communication system through the API; and enabling facilitation of multimodal communication sessions employing a communication user interface integrated to a user interface of the non-communication application through the API, wherein the non-communication application data is accessed through a thin client and exchanged bi-directionally with the communication system;
 upon establishment of the communication session that includes application sharing, activating one of an embedded and the attached user interface for facilitating the application sharing.

2. The method of claim 1, further comprising:
 upon completion of a communication session, preserving modifications to non-communication application data and -related data at the non-communication application.

3. The method of claim 1, further comprising:
 employing the received communication-related data and a plurality of parameters in initiation of a communication session.

4. The method of claim 1, wherein the communication user interface is one of embedded and docked to the non-communication application user interface.

5. The method of claim 1, wherein the non-communication application is one of locally installed and hosted.

6. The method of claim 1, wherein the non-communication application provides functionality associated with at least one from a set of: document processing, spreadsheet processing, presentation, analysis, calendaring, scheduling, audio data processing, video data processing, and graphics processing.

7. The method of claim 1, wherein the multimodal communication sessions include at least one from a set of: an audio modality, a video modality, a data sharing modality, an application sharing modality, white boarding modality, a text messaging modality, an email exchange modality, and an online conferencing modality.

8. The method of claim 7, wherein the communication-related data includes at least one from a set of: contact information, presence information, and modality information.

9. A computing device executing a non-communication application and capable of connecting to an enhanced communication system, the computing device comprising:
- a memory storing instructions;
- a communication server, the communication server managing conversations between users over at least one network;
- a processor coupled to the memory, the processor executing the non-communication application and exposing a communication application programming interface (API) to the non-communication application in conjunction with the instructions stored in the memory, wherein the communication API is configured to enable the non-communication application to:
- receive communication-related data from the enhanced communication system;
- manage the users computing device capabilities, applications capabilities, and network capabilities, including one or more of processing power and available memory;
- publish data to the enhanced communication system;
- employ the received communication-related data in initiation of a multimodal communication session;
- facilitate the multimodal communication session employing a communication user interface integrated to user interface of the non-communication application; and
- preserve a conversation history, newly created data, and modified data during the multimodal communication session,
- wherein the communication API includes a communication client object as a root entry point for the non-communication application, a contact manager, a conversation manager, and a device manager.

10. The computing device of claim 9, wherein the contact manager manages at least one from a set of: individual contact objects, contact group objects, search objects, and subscription objects.

11. The computing device of claim 9, wherein the conversation manager manages conversation objects that enable the non-communication application to create conversations, modality objects that enable one of starting a modality and accepting-a the modality, participant objects that enable one of addition and removal of participants, an audio channel object for starting and audio conversation, and a video channel object for starting a video conversation.

12. The computing device of claim 9, wherein the device manager manages registered audio and video devices to facilitate multimodal communications.

13. The computing device of claim 9, wherein the API further includes a self class to manage permissions objects representing granted permissions for other contacts to access a user's published information and a publication object to enable the non-communication application to publish the users contact information to the enhanced communication system.

14. The computing device of claim 9, wherein the API further includes one or more extensibility classes that manage an automation object for enabling a user to start conversations through an API call, a conversation window object to enable docking and undocking of a conversation user interface, and a registration object for registering application packages to be used for extensibility.

15. The computing device of claim 9, wherein the API further includes an object representing the computing devices' capabilities, another object representing the non-communication application's capabilities, and a further object representing network capabilities.

16. A computer-readable memory device with instructions stored thereon for enabling non-communication applications with enhanced communication capabilities, the instructions comprising:
- exposing a rich communication application programming interface (API) provided by an embedded user interface to a non-communication application, wherein the exposure allows the non-communication application to integrate with enhanced communication systems to achieve rich presence information, start a conversation, join a conference, start and communicate with participants with different modalities, and perform communication related tasks;
- receiving communication-related data from an enhanced communication system;
- publishing data to the enhanced communication system;
- receiving a request from a user to initiate a multimodal communication session through a communication portion of an application user interface enabled by the communication API;
- employing the received communication-related data in initiation of a multimodal communication session;
- facilitating the multimodal communication session employing a communication user interface integrated to a user interface of the non-communication application; and
- upon completion of the multimodal communication session, preserving a conversation history, newly created information, and modifications to non-communication application data and the communication-related data at the non-communication application;
- wherein the instructions comprise:
- employing the received communication-related data for at least one inherent function of the non-communication application.

17. The computer-readable memory device of claim 16, wherein the non-communication application user interface is one of a rich client user interface associated with a locally installed application and a browser for accessing a hosted non-communication application.

* * * * *

UNITED STATES PATENT AND TRADEMARK OFFICE
CERTIFICATE OF CORRECTION

| | |
|---|---|
| PATENT NO. | : 8,490,119 B2 |
| APPLICATION NO. | : 12/967770 |
| DATED | : July 16, 2013 |
| INVENTOR(S) | : Yiu-Ming Leung et al. |

It is certified that error appears in the above-identified patent and that said Letters Patent is hereby corrected as shown below:

In the Claims

Column 8, line 44, in Claim 2, delete "-related" and insert -- communication-related --, therefor.

Column 9, line 41, in Claim 11, delete "accepting-a" and insert -- accepting --, therefor.

Column 9, line 43, in Claim 11, delete "and" and insert -- an --, therefor.

Signed and Sealed this
Tenth Day of February, 2015

Michelle K. Lee
*Deputy Director of the United States Patent and Trademark Office*